United States Patent
Hong

(10) Patent No.: US 8,411,496 B2
(45) Date of Patent: Apr. 2, 2013

(54) SYSTEMS AND METHODS FOR SCHEDULING A MEMORY COMMAND FOR EXECUTION BASED ON A HISTORY OF PREVIOUSLY EXECUTED MEMORY COMMANDS

(75) Inventor: Du-Won Hong, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/428,780

(22) Filed: Mar. 23, 2012

(65) Prior Publication Data

US 2012/0185656 A1    Jul. 19, 2012

Related U.S. Application Data

(63) Continuation of application No. 12/432,299, filed on Apr. 29, 2009, now Pat. No. 8,171,242.

(30) Foreign Application Priority Data

May 21, 2008    (KR) .................................. 2008-47244

(51) Int. Cl.
*G06F 12/00*    (2006.01)

(52) U.S. Cl. .......................... 365/158; 711/103; 711/167
(58) Field of Classification Search .................. 365/158, 365/103, 167; 711/158, 103, 167
See application file for complete search history.

(56) References Cited

U.S. PATENT DOCUMENTS

| | | | |
|---|---|---|---|
| 6,917,992 B2 | 7/2005 | Grimsrud et al. | |
| 7,328,315 B2* | 2/2008 | Hillier et al. | 711/149 |
| 8,171,242 B2* | 5/2012 | Hong | 711/158 |
| 2007/0005896 A1 | 1/2007 | Chang et al. | |
| 2008/0005398 A1 | 1/2008 | Huffman | |

\* cited by examiner

*Primary Examiner* — Son Dinh
*Assistant Examiner* — Nam Nguyen
(74) *Attorney, Agent, or Firm* — Myers Bigel Sibley & Sajovec, P.A.

(57) ABSTRACT

A memory system is operated by maintaining a queue of memory commands to be executed, maintaining a list of previously executed memory commands, comparing local information associated with the commands to be executed with local information associated with the list of previously executed commands, and selecting one of the commands for execution from the queue of memory commands to be executed based on a result of the comparison.

19 Claims, 11 Drawing Sheets

Different Channel

Same Channel

Different Channel

Same Channel
Different Way

Same Channel
Same Way

Fig. 9

8KB Random Write Request

| Host Request | | NCQ Execution Without Reordering | | | Present Invention (NCQ Reordering) | | |
|---|---|---|---|---|---|---|---|
| Idx | Unit | Idx | Unit | Idx | Idx | Unit | Idx |
| 0 | 0 | 0 | 0 | 30 | 0 | 0 | 30 |
| 1 | 1 | 1 | 1 | 30 | 1 | 1 | 30 |
| 2 | 5 | 2 | 5 | 30 | 2 | 2 | 30 |
| 3 | 3 | 3 | 3 | 30 | 3 | 3 | 30 |
| 4 | 4 | 4 | 4 | 30 | 4 | 4 | 30 |
| 5 | 4 | 5 | 4 | 123 | 5 | 5 | 30 |
| 6 | 5 | 6 | 5 | 30 | 6 | 6 | 30 |
| 7 | 5 | 7 | 5 | 123 | 7 | 7 | 30 |
| 8 | 6 | 8 | 6 | 30 | 8 | 0 | 30 |
| 9 | 1 | 9 | 1 | 30 | 9 | 1 | 30 |
| 10 | 2 | 10 | 2 | 30 | 10 | 2 | 30 |
| 11 | 7 | 11 | 7 | 30 | 11 | 3 | 30 |
| 12 | 0 | 12 | 0 | 30 | 12 | 4 | 30 |
| 13 | 7 | 13 | 7 | 93 | 13 | 5 | 30 |
| 14 | 5 | 14 | 5 | 30 | 14 | 6 | 30 |
| 15 | 6 | 15 | 6 | 30 | 15 | 7 | 30 |
| 16 | 0 | 16 | 0 | 30 | 16 | 0 | 30 |
| 17 | 3 | 17 | 3 | 30 | 17 | 1 | 30 |
| 18 | 4 | 18 | 4 | 30 | 18 | 2 | 30 |
| 19 | 1 | 19 | 1 | 30 | 19 | 3 | 30 |
| 20 | 5 | 20 | 5 | 30 | 20 | 4 | 30 |

8KB Random Read Request

| Host Request | | NCQ Execution Without Reordering | | | Present Invertion (NCQ Reordering) | | |
|---|---|---|---|---|---|---|---|
| Idx | Unit | Idx | Unit | Idx | Idx | Unit | Idx |
| 0 | 0 | 0 | 0 | 15 | 0 | 0 | 15 |
| 1 | 1 | 1 | 1 | 15 | 1 | 1 | 15 |
| 2 | 5 | 2 | 5 | 15 | 2 | 2 | 15 |
| 3 | 3 | 3 | 3 | 15 | 3 | 3 | 15 |
| 4 | 4 | 4 | 4 | 15 | 4 | 4 | 15 |
| 5 | 4 | 5 | 4 | 123 | 5 | 5 | 15 |
| 6 | 5 | 6 | 5 | 15 | 6 | 6 | 15 |
| 7 | 5 | 7 | 5 | 123 | 7 | 7 | 15 |
| 8 | 6 | 8 | 6 | 15 | 8 | 0 | 18 |
| 9 | 1 | 9 | 1 | 15 | 9 | 1 | 15 |
| 10 | 2 | 10 | 2 | 15 | 10 | 2 | 15 |
| 11 | 7 | 11 | 7 | 15 | 11 | 3 | 15 |
| 12 | 0 | 12 | 0 | 15 | 12 | 4 | 15 |
| 13 | 7 | 13 | 7 | 108 | 13 | 5 | 15 |
| 14 | 5 | 14 | 5 | 15 | 14 | 6 | 15 |
| 15 | 6 | 15 | 6 | 15 | 15 | 7 | 15 |
| 16 | 0 | 16 | 0 | 15 | 16 | 0 | 18 |
| 17 | 3 | 17 | 3 | 15 | 17 | 1 | 15 |
| 18 | 4 | 18 | 4 | 15 | 18 | 2 | 15 |
| 19 | 1 | 19 | 1 | 15 | 19 | 3 | 15 |
| 20 | 5 | 20 | 5 | 48 | 20 | 4 | 15 |

557 us     321 us

SYSTEMS AND METHODS FOR SCHEDULING A MEMORY COMMAND FOR EXECUTION BASED ON A HISTORY OF PREVIOUSLY EXECUTED MEMORY COMMANDS

CROSS REFERENCE TO RELATED APPLICATION

This application is a continuation of U.S. patent application Ser. No. 12/432,299 now U.S. Pat. No. 8,171,242, filed on Apr. 29, 2009, which claims priority from Korean Patent Application No. 10-2008-47244, filed May 21, 2008, the disclosures of which are incorporated herein by reference in their entireties.

BACKGROUND OF THE INVENTION

The present invention relates generally to data processing systems and, more particularly, to the use of storage devices, such as memory systems in data processing systems.

Native Command Queuing (NCQ) is a technology that is designed to enhance the performance of Hard Disk Drives (HDDs) that use a Serial Advanced Technology Attachment (SATA) interface or other interface that supports command queuing. In particular, NCQ may allow a hard disk to internally optimize the order in which received read and write commands are executed, which may reduce unnecessary drive head movement and improve performance. Solid State Disk (SSD) devices, however, do not have the mechanical moving parts that are used in HDDs. As a result, NCQ techniques have not generally been applied to SSD devices.

SUMMARY

According to some embodiments of the present invention, a memory system is operated by maintaining a queue of memory commands to be executed, maintaining a list of previously executed memory commands, comparing local information associated with the commands to be executed with local information associated with the list of previously executed commands, and selecting one of the commands for execution from the queue of memory commands to be executed based on a result of the comparison.

In other embodiments, the local information comprises channel, way, Direct Memory Access (DMA) time, address translation time, and/or hardware timing information.

In still other embodiments, selecting one of the commands for execution comprises selecting the one of the commands for execution from the queue of memory commands to be executed that has a shortest expected blocking time.

In still other embodiments, selecting one of the commands for execution comprises beginning with the one of the previously executed memory commands that was most recently executed and proceeding until the command for execution is selected, performing the following: discarding candidate commands for execution that are associated with a same channel as the previously executed command when the remaining candidate commands are not all associated with the same channel, then discarding candidate commands that are associated with the same channel and way as the previously executed command when the remaining candidate commands are all associated with the same channel, but are not all associated with the same channel and way, then discarding candidate commands that have longest Direct Memory Access (DMA) times when the remaining candidate commands are all associated with the same channel and way.

In still other embodiments, selecting one of the commands for execution comprises selecting one of the commands for execution from the queue of memory commands to be executed that is associated with the same channel and way as a more recent previously executed command when each of the remaining candidate commands are associated with the same channel and way as at least one of the previously executed commands.

In still other embodiments, DMA times are calculated based on memory sector size and/or sector count.

In still other embodiments, the channel and way are derived from Logical Block Address (LBA) information.

In still other embodiments, the method further comprises removing one of the previously executed commands from the list of previously executed memory commands when all operations associated with the one of the previously executed commands have completed.

In still other embodiments, command execution comprises address translation.

In still other embodiments, the list of previously executed memory commands is a circular list.

In still other embodiments, at least one of the above-described methods is performed by a Flash Translation Layer (FTL).

In still other embodiments, the memory comprises a flash memory.

In still other embodiments, the flash memory comprises a NAND, NOR, and/or a One_NAND type flash memory.

In further embodiments of the present invention, a memory system comprising a host, a memory controller, and a memory is operated by sending memory commands from the host to the memory controller, determining an execution order for the memory commands based on a history of previously executed memory commands, sending write data from the host to the memory controller while determining the execution order, writing the write data from the memory controller to the memory, reading read data from the memory into the memory controller, and sending the read data from the memory controller to the host.

In still further embodiments, determining the execution order comprises maintaining a queue of the memory commands to be executed, maintaining a list of the previously executed memory commands, comparing local information associated with the memory commands to be executed with local information associated with the list of previously executed memory commands, and selecting one of the memory commands for execution from the queue of memory commands to be executed based on a result of the comparison.

In still further embodiments, the local information comprises channel, way, Direct Memory Access (DMA) time, address translation time, and/or hardware timing information.

In still further embodiments, the memory comprises a flash memory.

In still further embodiments, the flash memory comprises a NAND, NOR, and/or a One_NAND type flash memory.

In other embodiments of the present invention, a memory system, comprises a memory and a memory controller that is configured to maintain a queue of commands for the memory to be executed, maintain a list of previously executed memory commands; compare local information associated with the commands to be executed with local information associated with the list of previously executed commands; and select one of the commands for execution from the queue of memory commands to be executed based on a result of the comparison.

In still other embodiments, the local information comprises channel, way, Direct Memory Access (DMA) time, address translation time, and/or hardware timing information.

In still other embodiments, the memory comprises a flash memory.

In still other embodiments, the flash memory comprises a NAND, NOR, and/or a One_NAND type flash memory.

In still other embodiments, the memory system is embodied in a memory card device, Solid State Drive (SSD) device, ATA bus device, Serial ATA (SATA) bus device, Small Computer System Interface (SCSI) device, Serial Attached SCSI (SAS) device, Multi-Media Card (MMC) device, Secure Digital (SD) device, memory stick device, Hard Disk Drive (HDD) device, Hybrid Hard Drive (HHD) device, and/or a Universal Serial Bus (USB) flash drive device.

In still other embodiments, the memory system is embodied in a graphics card, a computer, a mobile terminal, a Personal Digital Assistant (PDA), a camera, a game console, an MP3 player, a television, a DVD player, a router, and/or a GPS system.

Other systems and methods according to embodiments of the invention will be or become apparent to one with skill in the art upon review of the following drawings and detailed description. It is intended that all such additional systems and methods be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which:

FIGS. 9 and 10 illustrate experimental results in which write request commands and read request commands are performed on a memory system in accordance with some embodiments of the present invention.

DETAILED DESCRIPTION OF EMBODIMENTS

Figure 1:
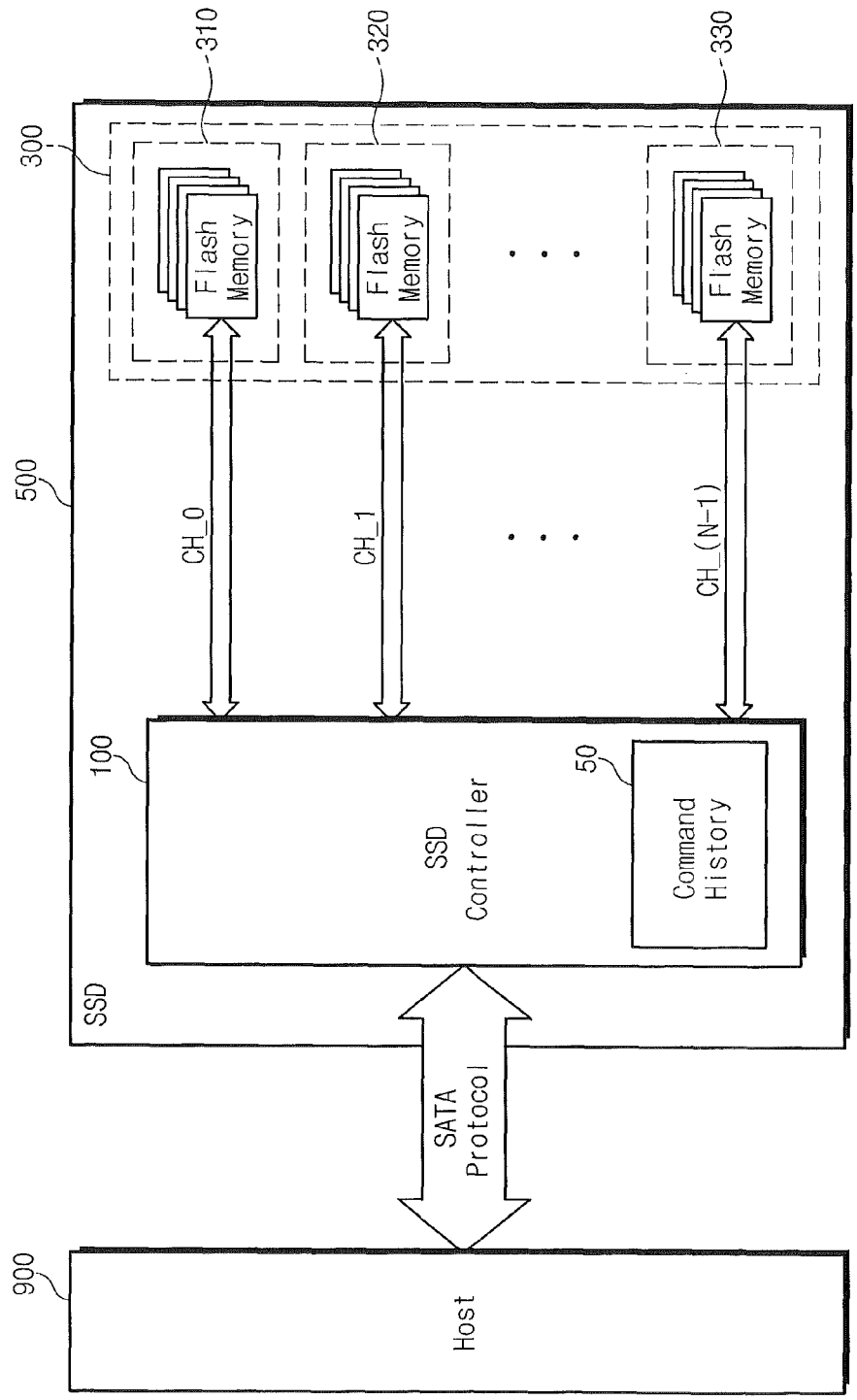
FIG. 1 is a block diagram of a memory system according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For purposes of illustration, various embodiments of the present invention are described herein with reference to a memory system comprising a flash memory data storage device. It will be understood that the data storage device is not limited to implementation as a flash memory device, but can be implemented generally as an erase before write memory device. Also, it will be understood that the data storage device is not limited to implementation as a non-volatile memory device, and can be implemented as a volatile memory device, such as a dynamic random access memory (DRAM), and so on. The data storage device may be a memory card device, Solid State Drive (SSD) device, ATA bus device, Serial ATA (SATA) bus device, Small Computer System Interface (SCSI) device, Serial Attached SCSI (SAS) device, Multi-Media Card (MMC) device, Secure Digital (SD) device, memory stick device, Hard Disk Drive (HDD) device, Hybrid Hard Drive (HHD) device, and/or a Universal Serial Bus (USB) flash drive device.

According to some embodiments of the present invention, a memory system, such as, for example, a Solid State Disk (SSD) device, that includes a memory controller and a memory can be operated by maintaining a queue of memory commands to be executed along with a list of previously executed memory commands. A comparison can be made between the commands to be executed and those commands that have been previously executed to select the next command for execution in such that the expected blocking may be reduced, which may enhance the performance of the memory system.

Referring now to FIG. 1, an electronic apparatus comprises an SSD memory system 500 and a host 900 that communicate using, for example, the Serial Advanced Technology Attachment (SATA) protocol or other protocol that supports command queuing. Native Command Queuing (NCQ) and Tagged Command Queuing (TCQ) may be used in some embodiments of the present invention for command queuing. The SSD 500 comprises an SSD controller 100 and a flash memory 300. The flash memory 300 will be described as an example where embodiments of the present invention may be applied. However, the flash memory 300 to be described is not limited to a specific form, or program or read characteristic of the flash memory of the present invention. The flash memory 300 comprises multiple flash chips 310, 320, . . . 330 that are associated with communication channels CH_0, CH_1, and CH_(N−1), respectively. In addition, there may be multiple flash chips associated with each communication channel. Flash chips associated with the same channel may be identified by Way number. A management grouping for channels in a flash memory system is sometimes called a "unit," and a management grouping for Ways in a flash memory system is sometimes called a "bank." The controller 100 may be configured to store the command history 50 for the flash memory 300 and to schedule the execution of commands received from the host 900. In some embodiments of the present invention, the controller 100 selects a memory command for execution that has the shortest expected blocking time based on the command history 50 of previously executed memory commands. In some embodiments, blocking time refers to the waiting time caused by a communication channel being busy or a flash memory chip being busy. The communication interface between the host 900 and the memory system 500 may support Native Command Queuing (NCQ) or other command queuing method to allow the host 900 to transmit multiple memory commands without interruption. Some embodiments of the present invention may be applied to systems in which memory command queuing is supported and multiple communication channels are configured between the controller 100 memory and the flash 300 memory.

Figure 2:
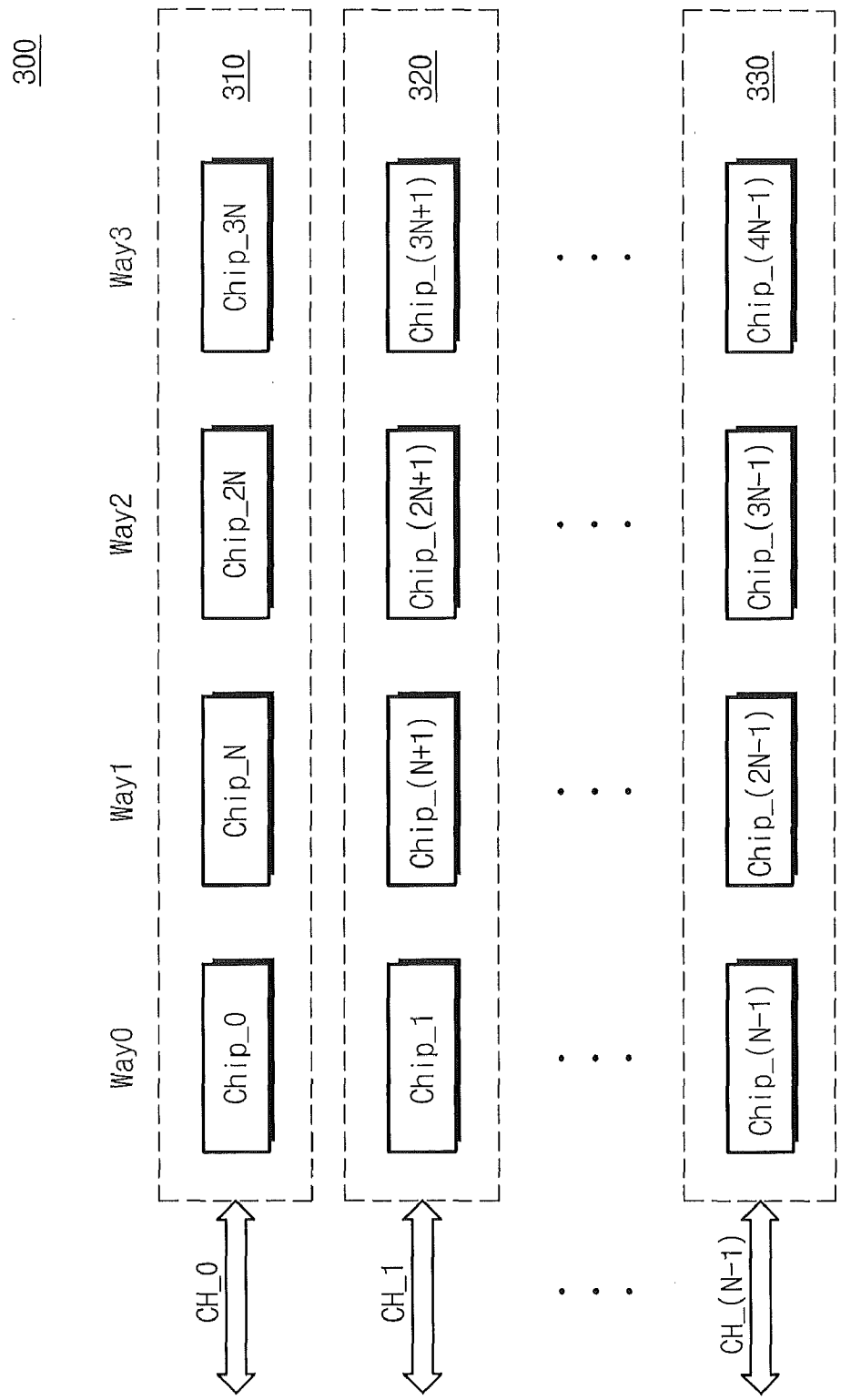
FIG. 2 is a block diagram that illustrates a memory of the memory system of FIG. 1 in accordance with some embodiments of the present invention.

FIG. 2 is a block diagram that illustrates the flash memory 300 of FIG. 1 in more detail according to some embodiments of the present invention. As shown in FIG. 2, the flash memory 300 comprises multiple flash chips 310, 320, . . . 330 that are associated with communication channels CH_0, CH_1, and CH_(N−1), respectively. Each communication channel may operate independently of the other communication channels. Flash chips that are share the same communication channel are differentiated by Way number. According to some embodiments of the present invention, each chip in the flash memory 300 may be identified by Way and communication channel, which can be calculated based on the Logical Block Address (LBA). In some embodiments, the flash memory 300 is a NAND, NOR, and/or a One_NAND type flash memory.

Figure 3A:
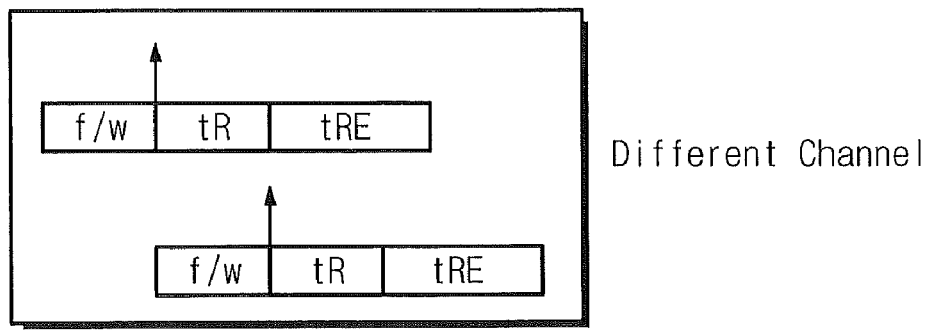
FIGS. 3A and 3B are block diagrams that illustrate read operations in the memory system of FIG. 1 according to some embodiments of the present invention.
Figure 3B:
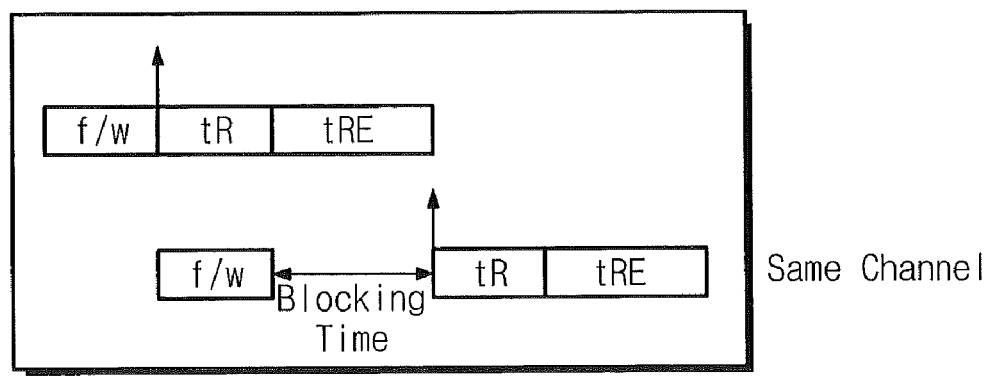

FIGS. 3A and 3B are block diagrams that illustrate the timing requirements when executing multiple read commands on the SSD 500 of FIG. 1. As used in FIGS. 3A and 3B, f/w denotes the time associated with firmware operations, tR denotes the read time from the memory cell to a register inside the flash memory 300, and tRE denotes the read time from the register inside the flash memory 300 to the RAM inside the controller 100. As shown in FIG. 3A, when multiple read commands are directed to the flash memory 300 on different communication channels, the read commands can be executed in parallel. In FIG. 3A, the time f/w associated with firmware operations of the read commands on different communication channels may or may not the same to each other. For example, the directed read commands may be executed at the same time on the different communication channels. In addition, the directed read commands may be executed at different timing to each other for waiting for completion of the previously executed command on each of communication channels. As shown in FIG. 3B, however, when multiple read commands are directed to the flash memory 300 on the same communication channel, the second read command is blocked until the first read command completes the read from the flash 300 register to the RAM inside the controller 100.

Figure 4A:
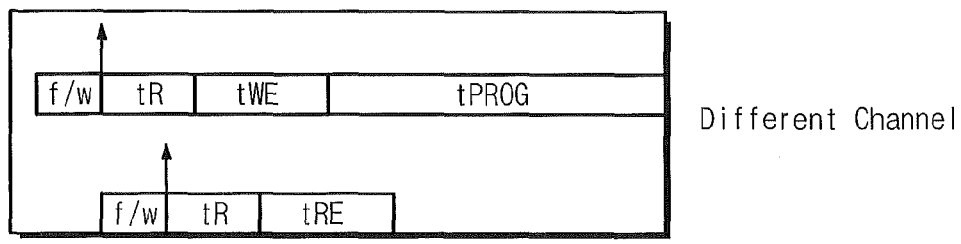
FIGS. 4A, 4B, and 4C are block diagrams that illustrate write operations in the memory system of FIG. 1 according to some embodiments of the present invention.
Figure 4B:
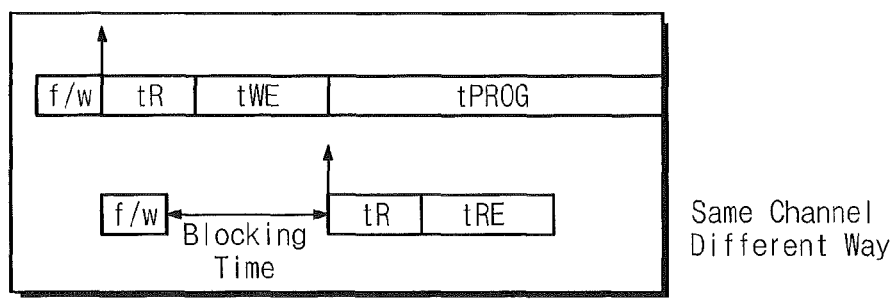
Figure 4C:
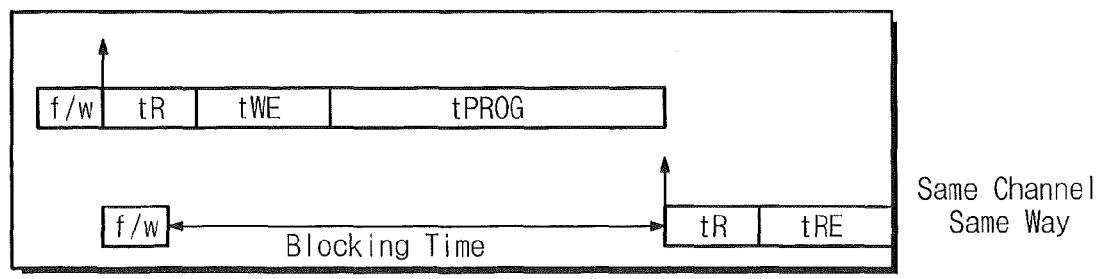

FIGS. 4A, 4B, and 4C are block diagrams that illustrate the timing requirements when executing multiple write commands on the SSD 500 of FIG. 1. As used in FIGS. 4A, 4B, and 4C, tWE denotes the write time from the RAM inside the controller 100 to the page buffer inside the flash memory 300 and tPROG denotes the write time from the page buffer to the cell array inside the flash memory 300. As shown in FIG. 4A, when multiple read and/or write commands are directed to the flash memory 300 on different communication channels, the read and/or write commands can be executed in parallel. In FIG. 4A, the time f/w associated with firmware operations of the read and/or write commands on different communication channels may or may not the same to each other. For example, the directed read and/or write commands may be executed at the same time on the different communication channels. In addition, the directed read and/or write commands may be executed at different times relative to each other for waiting for completion of the previously executed read and/or write command on each of communication channels. As shown in FIG. 4B, however, when multiple read and/or write commands are directed to the flash memory 300 on the same communication channel, but different Ways, the read operation is blocked until write operation completes the write from the RAM inside the controller 100 to the page buffer inside the flash memory 300. As shown in FIG. 4C, when multiple read and/or write commands are directed to the flash memory 300 on the same communication channel and same ways, the read operation is blocked until the write operation completes the write from the RAM inside the controller 100 to the page buffer inside the flash memory 300 as well as the write from the page buffer to the cell array inside the flash memory 300. In FIGS. 4A, 4B, and 4C, the time tR is not needed if writing a whole page; however, when writing a partial page, a modified copy back operation is performed where data is read first into the page buffer inside the flash memory 300, additional data is written to the page buffer, and then the page buffer is written to the cell array.

Figure 5:
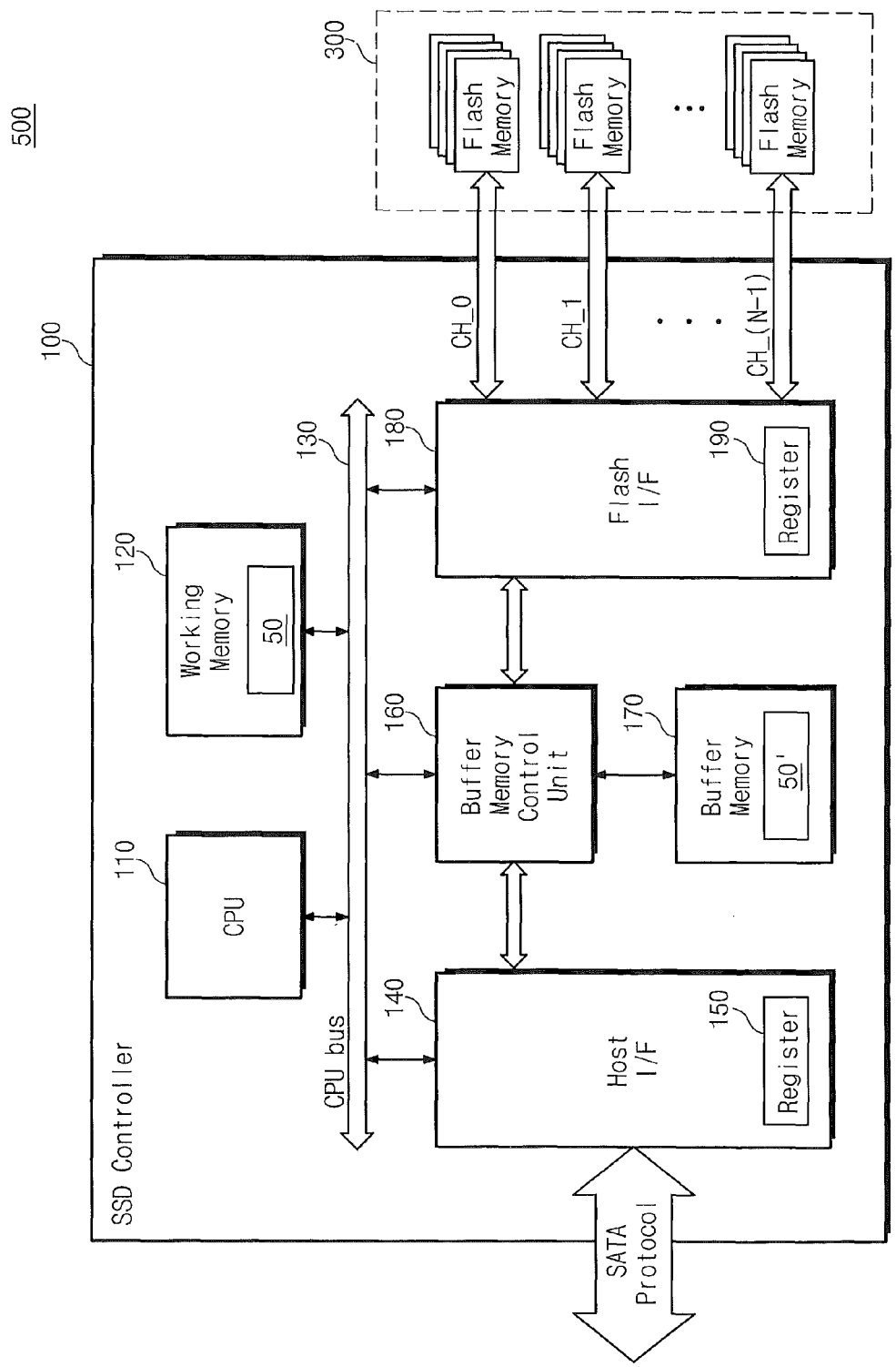
FIG. 5 is a block diagram of a memory system according to further embodiments of the present invention.

FIG. 5 is a detailed block diagram of the SSD 500 according to some embodiments of the present invention. The controller 100 comprises a CPU 110, a working memory 120 that includes a command history 50, a host interface 140, which includes a register 150 for communicating commands/data between the controller 100 and a host, a buffer memory control unit 160, and a flash interface 180, which includes a register 190 for communicating commands/data between the controller 100 and the flash memory 300. The various controller 100 components communicate via a CPU bus 130. The host interface 140 may be configured to communicate using various interface protocols, such as USB, MMC, peripheral component interconnection bus-express (PCI-E), advanced technology attachment (ATA), serial-ATA (SATA), parallel-ATA, small computer system interface (SCSI), SAS (Serial Attached SCSI), enhanced small device interface (ESDI), and integrated driver electronics (IDE). The host interface 140 may support a protocol that supports command queuing, such as the SATA protocol, the SCSI protocol, and the SAS protocol. The buffer memory 170 may be configured to store the data transmitted between the flash memory 300 and the host 900 and also to store the command history 50', which may also be stored in the working memory 120 as command history 50 in some embodiments of the present invention. Thus, the command history may be stored in one or both of the working memory 120 and the buffer memory 170 in accordance with various embodiments of the present invention. The buffer memory 170 may be located on an internal area of the SSD controller 100, and may be located on an external area of the SSD controller 100. The host interface 140 may be configured to transform the address to a LBA. The Flash Translation Layer (FTL) in the working memory 120 may be configured to translate the LBA to a Physical Block Address (PBA). The FTL may be configured to use the command history 50 and/or 50' to schedule a memory command for execution that has a reduced or in some cases shortest expected blocking time. The memory scheduled command along with the PBA are transmitted to the flash memory 300 via the register 190 in the flash interface 180.

Figure 6:
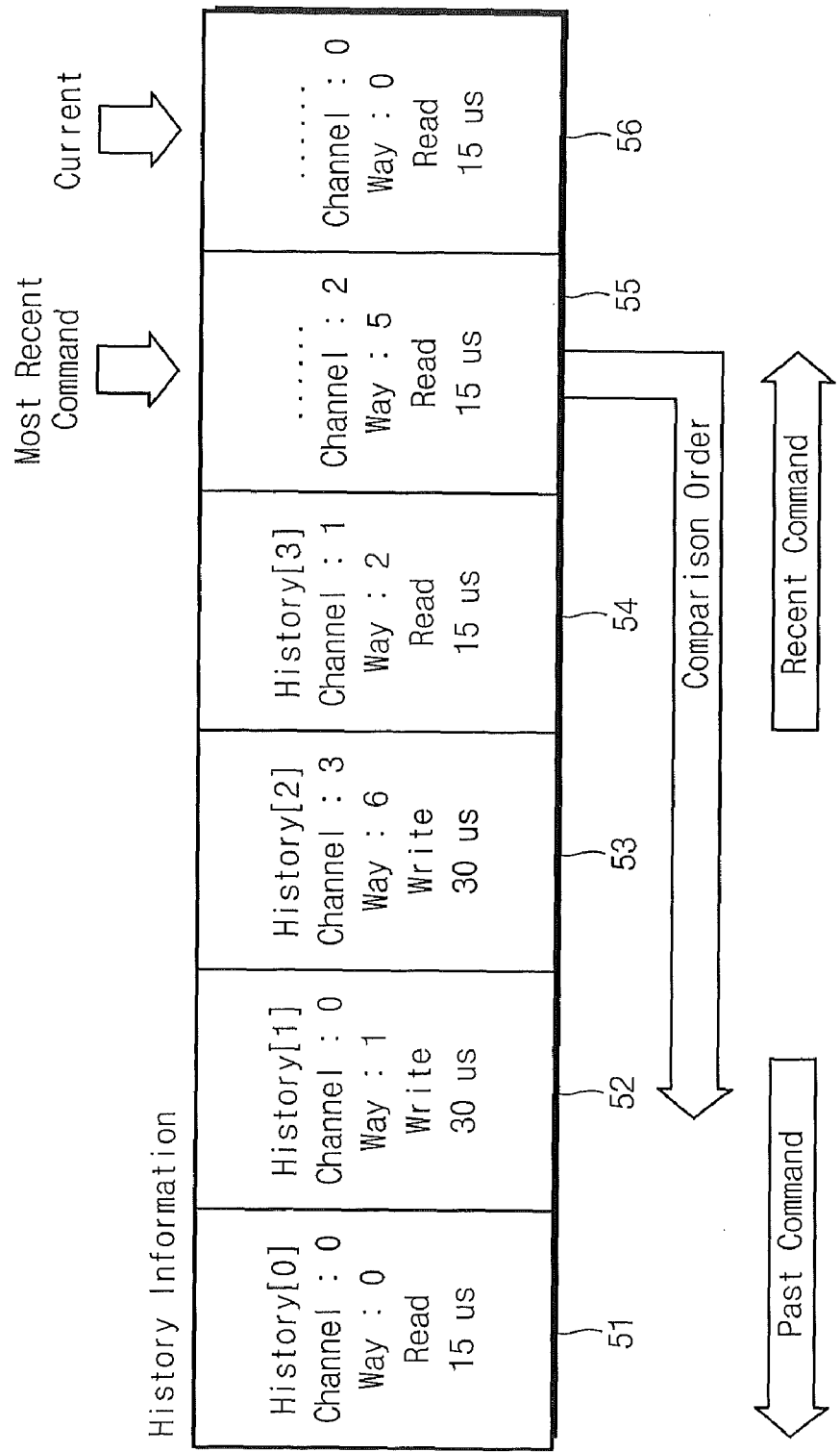
FIG. 6 is a block diagram that illustrates a memory command history according to some embodiments of the present invention.

FIG. 6 is a block diagram that illustrates a memory command history according to some embodiments of the present invention. As shown in FIG. 6, each command 51-56 in the command history queue or list may comprise such local information as channel, Way, Direct Memory Access (DMA) time, and whether the command is a read or write command according to some embodiments of the present invention. In other embodiments, the local information may also comprise address translation time and/or hardware timing information. DMA times may be based on memory sector size and/or sector count. A previously executed command may be removed from the list when all operations associated with the command have completed. In some embodiments, the command history queue may be a circular queue. A command may be considered as having been executed after address translation has been completed even though the full operation, such as the write operation into the flash cell array, has not yet completed, according to some embodiments of the present invention.

Figure 7:
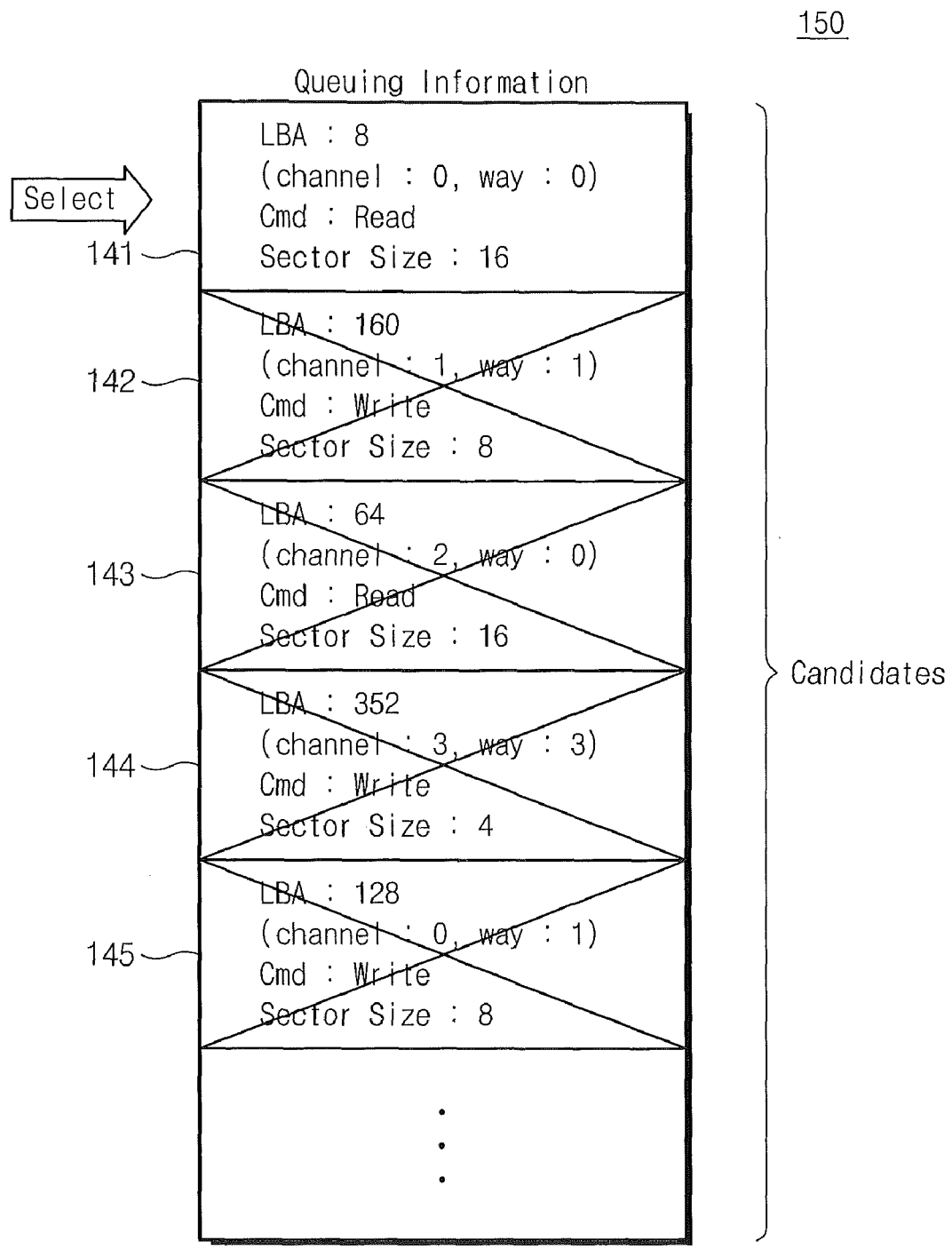
FIG. 7 is a block diagram that illustrates methods for selecting a memory command for execution according to some embodiments of the present invention.

Exemplary operations for selecting a memory command for execution according to some embodiments of the present invention will now be described by way of example with reference to block diagrams of FIGS. 6 and 7. FIG. 6 illustrates a memory command history list and FIG. 7 illustrates a queue of candidate memory commands 150 for execution according to some embodiments of the present invention. According to some embodiments of the present invention, the FTL module may be configured to compare local information associated with the list of candidate memory commands to be executed shown in FIG. 7 with the local information associated with the list of previously executed commands shown in FIG. 6 so as to select a command for execution that has a reduced or shortest expected blocking time.

Referring to FIGS. 6 and 7, operations begin by the FTL examining the command 55 and determining that it was executed on channel 2. The FTL then discards candidate command 143 from the candidate queue of FIG. 7 because it is also designated for channel 2. Next, the FTL examines command 54 in FIG. 6 to determine that it was executed on channel 1. The FTL then discards candidate command 142 from the candidate queue of FIG. 7 because it is also designated for channel 1. Next, the FTL examines command 53 in FIG. 6 to determine that it was executed on channel 3. The FTL then discards candidate command 144 from the candidate queue of FIG. 7 because it is also designated for channel 3. Next, the FTL examines command 52 in FIG. 6 to determine that it was executed on channel 0. The FTL then determines that the remaining candidate commands 141 and 145 are both designated for channel 0. The FTL examines command 51 of FIG. 6 and determines that it also was executed on channel 0; however, command 51 was designated for Way 0 while command 52 was designated for Way 1. The candidate commands 141 and 145 of FIG. 7; however are designated for Way 0 and Way 1, respectively. The FTL then examines the DMA times associated with commands 51 and 52 to determine that command 51 has a DMA time of 15 μs while command 52 has a DMA time of 30 μs. Because the previously executed command 51 on channel 0, Way 0 has a shorter DMA time than the previously executed command 52 on channel 0, Way 1, the FTL discards candidate command 145 designated for channel 0, Way 1 and selects candidate command 141 on channel 0, way 0 for execution. After selecting the candidate command 141 for execution, the local information 56 corresponding to the candidate command 141 is stored in the command history queue or list in FIG. 6. In some embodiments, if the best candidate command for execution ends up being a write commands associated with the same channel and way as a previous write command, then the preferred candidate command may be a command that conflicts with a more recent previously executed command in history, particularly if the more recently executed command was a read command as read commands take less time to complete than a write command. In another exemplary operations for selecting a memory command for execution according to some embodiments of the present invention, the read and/or write commands may be executed in channels being completed the previous read and/or write command by monitoring the channel conditions by the FTL. In addition, the read and/or write commands may be executed first on channels having free way(s) based on the monitoring results of the channel conditions by the FTL.

Figure 8:
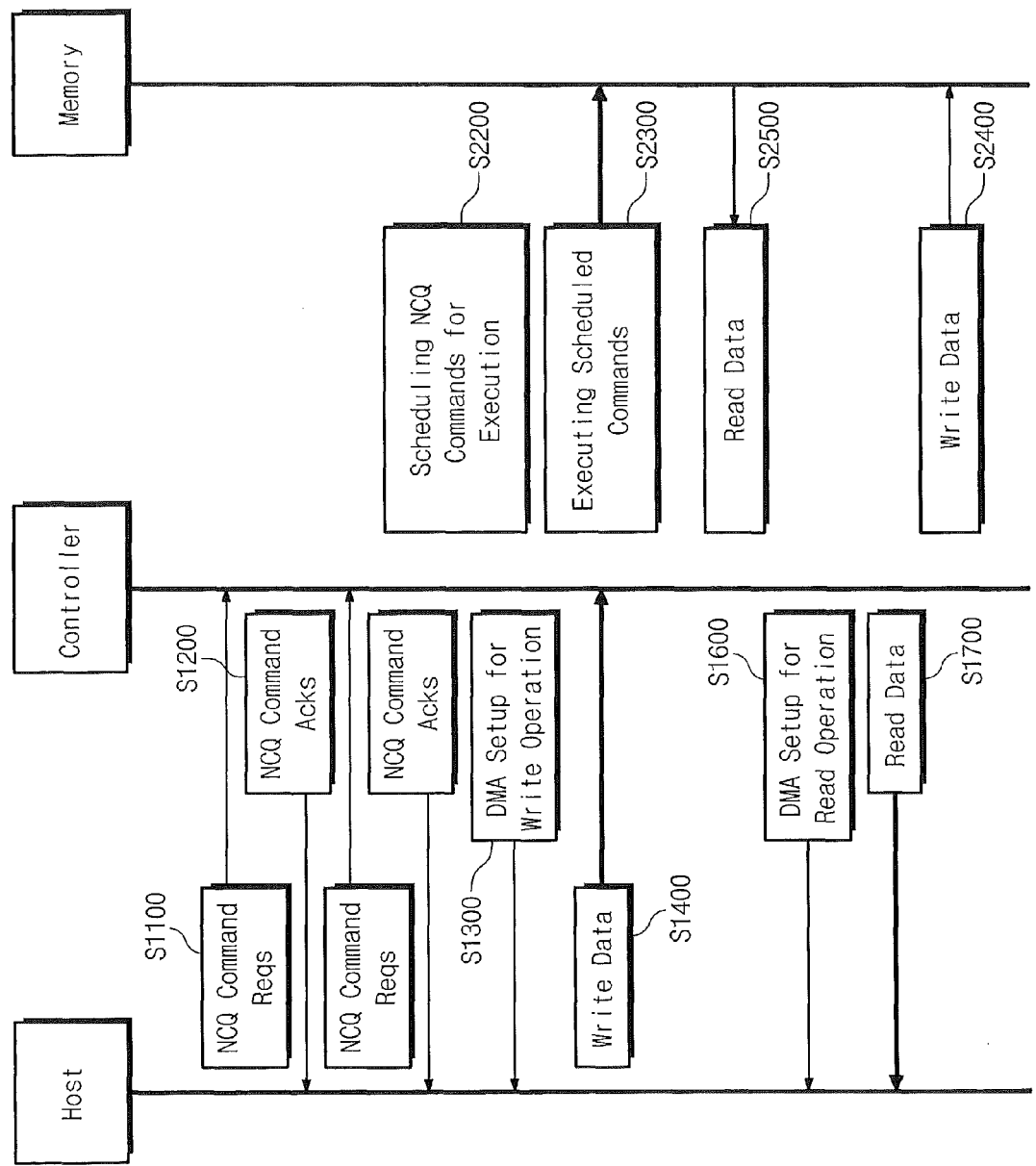
FIG. 8 is a message flow diagram that illustrates operations of a memory system in which a memory command is selected for execution based on a history of previously executed memory commands.

FIG. 8 is a message flow diagram that illustrates operations of a memory system in which a memory command is selected for execution based on a history of previously executed memory commands in accordance with some embodiments of the present invention. The host 900 sends a read and a write NCQ command request to the controller 100 (S1100) through a host interface supporting a protocol that supports command queuing, such as the SATA protocol, the SCSI protocol, and the SAS protocol. The controller 100 responds with acknowledgements (S1200). The controller 100 then sends a request to the host for a DMA setup for the write operation (S1300). The timing for the DMA setup varies based on command. In the case of a write command, the controller 100 requests DMA setup after the NCQ command is generated to get the write data. The DMA setup can be requested during NCQ command scheduling at the controller 100. When the controller 100 sends the DMA setup request to the host 900, the host sends the write data to the controller 100 (S1400). The controller 100 may store the write data in the buffer memory 170. While the controller 100 stores the write data in the buffer memory, the FTL schedules the received NCQ commands for execution as described above with respect to FIGS. 6 and 7 (S2200). In a dual processor system, for example, the controller 100 may schedule another command before the FTL completes the mapping operation between LBA and PBA. The scheduled command is then executed on the memory 300 (S2300). In the case of a write command, the write data is provided from the buffer memory in the controller 100 to the memory 300 (S2400). In the case of a read command, the data read from the memory 300 is stored in the buffer memory in the controller 100 (S2500). The controller 100 sends a request to the host 900 for DMA setup for the read command (S1600). The controller 100 then provides the read data stored in the buffer memory to the host 900 (S1700).

FIGS. 9 and 10 illustrate experimental results in which write request commands and read request commands are performed on a memory system in accordance with some embodiments of the present invention. As shown in FIG. 9, the time to perform an 8 KB random write may be reduced from 879 μs to 630 μs using memory command reordering according to some embodiments of the present invention. As shown in FIG. 10, the time to perform an 8 KB random read may be reduced from 557 μs to 321 μs using memory command reordering according to some embodiments of the present invention.

Figure 11:
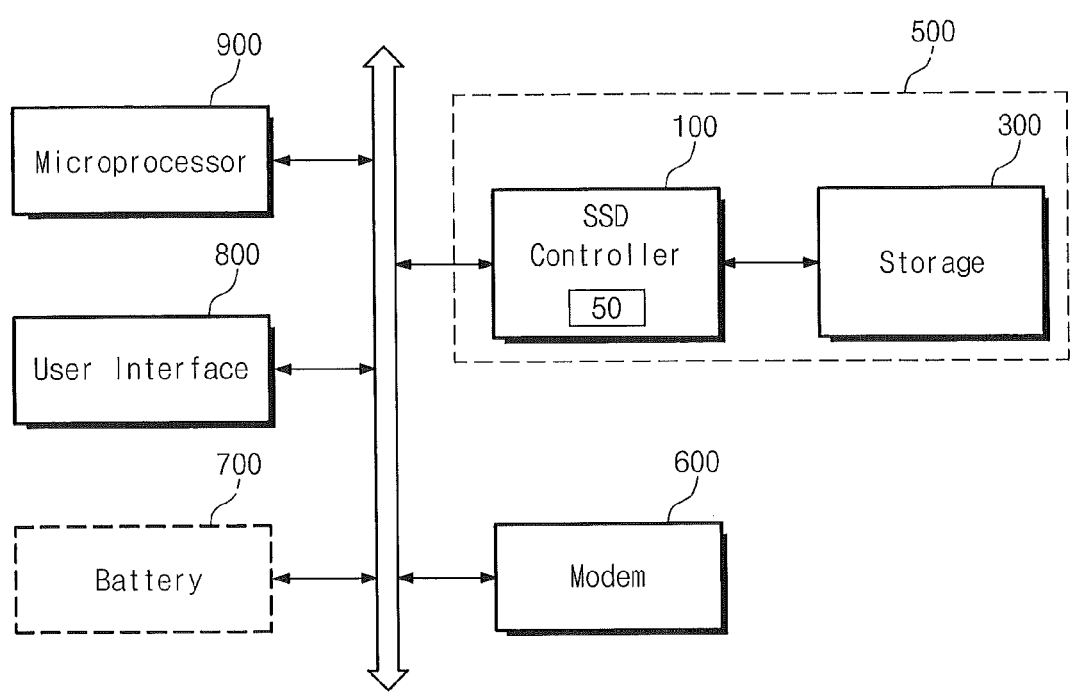
FIG. 11 is a block diagram of an electronic system that incorporates a memory system according to some embodiments of the present invention.

FIG. 11 is a block diagram illustrates an electronic system, such as a computer system, that incorporates a memory system in accordance with some embodiments of the present invention. As shown in FIG. 11, the electronic system may include a microprocessor host 900, user interface 800, battery 700, SSD 500, which comprises an SSD memory controller 100 having a list of previously executed memory commands 50 stored therein and memory 300 (e.g., flash memory), and a modem 600 that are coupled to each other via an address/data bus. The controller 100 and memory 300 may be embodied as described above with respect to FIGS. 1-10. Thus, memory systems including the controller 100 and memory 300, according to some embodiments of the present invention, may be embodied in electronic systems, such as, but not limited to, a graphics card, a computer, a mobile terminal, a Personal Digital Assistant (PDA), a camera, a game console, an MP3 player, a television, a DVD player, a router, and/or a GPS system.

The SSD memory controller 100 and/or the memory 300, according to some embodiments of the present invention, may be placed on the computer system via a variety of package types including Package-on-Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip-On-Board (COB), CERamic Dual In-line Package (CERDIP), Plastic Metric Quad Flat Pack (MQFP), Thin Quad Flat Pack (TQFP), Small Outline (SOIC), Shrink Small Outline Package (SSOP), Thin Small Outline (TSOP), Thin Quad Flat Pack (TQFP), System In Package (SIP), Multi-Chip Package (MCP), Wafer-level Fabricated Package (WFP), Wafer-level Processed Stack Package (WSP), and/or Wafer-level Processed Package (WSP), among others. In some embodiments, the memory cells of the flash memory device 100 may be structured in various forms having charge storage layers. A charge storage architecture of the flash memory device may be implemented by including charge-trapping layers, stacked cell arrays where plural cell arrays are stacked, flash structures without source and drain regions, and/or pin-type flash structures, among others.

Many variations and modifications can be made to the embodiments without substantially departing from the principles of the present invention. All such variations and modifications are intended to be included herein within the scope of the present invention, as set forth in the following claims.

That which is claimed:

1. A semiconductor device, comprising:
a memory device configured to comprise multiple memory chips that are associated with a plurality of channels, each channel operating independently of the other communication channels, each memory chip identifiable by a plurality of ways and the plurality of communication channels; and
a memory controller configured to compare queuing information associated with commands to be executed with history information associated with a list of previously executed commands and to discard candidate commands for execution that are associated with a same channel as the previously executed command when the remaining candidate commands are not all associated with the same channel.

2. The semiconductor device of claim 1, wherein the memory controller is configured to discard candidate commands that are associated with the same channel and way as the previously executed command when the remaining candidate commands are all associated with the same channel, but are not all associated with the same channel and way.

3. The semiconductor device of claim 1, wherein the memory controller is configured to select at least one of the plurality of commands, the selected at least one command indicating at least one memory chip which is not in write or read operation, based on the history information of the previously executed commands when the plurality of communication channels are in data transfer operation.

4. The semiconductor device of claim 1, wherein the memory controller is configured to select at least one of the plurality of commands, the selected at least one command has the shortest Direct Memory Access (DMA) times among the plurality of commands, based on the history information of the previously executed commands when the plurality of communication channels are in data transfer operation and the memory chips are in write or read operation.

5. The semiconductor device of claim 4, wherein the DMA times are calculated based on memory sector size or sector count.

6. The semiconductor device of claim 1, wherein the history information comprises channel, way, Direct Memory Access (DMA) times, address translation time, or hardware timing information.

7. The semiconductor device of claim 1, wherein the memory controller is configured to compare the queuing information with the history information by beginning to compare one of the previously executed commands that was most recently executed and proceeding until the at least one of the plurality of commands for execution is selected.

8. The semiconductor of claim 1, wherein the memory controller is configured to remove one of the previously executed commands from a list of the previously executed commands when all operations associated with the one of the previously executed commands have completed.

9. A semiconductor device comprising:
a memory controller that is configured to maintain a queue of plurality of commands to be executed; and
a memory device connected to the memory controller through plurality of communication channels,
wherein the memory device comprises
a first nonvolatile memory connected to the memory controller through a first communication channel among the plurality of communication channels;
a second nonvolatile memory connected to the memory controller through a second communication channel among the plurality of communication channels,
wherein the memory controller is configured to select one command from the queue of the plurality of commands, the selected one command indicating the second communication channel, based on history information of previously executed commands when the first communication channel is busy but the second communication channel is not busy.

10. The semiconductor of claim 9, wherein the history information of the previously executed commands comprises communication channel information of the previously executed commands, and wherein information of the first communication channel is managed at the history information and information of the second communication channel is not managed at the history information.

11. The semiconductor of claim 9, wherein the memory device further comprises;

a third nonvolatile memory connected to the memory controller through the first communication channel; and a fourth nonvolatile memory connected to the memory controller through the second communication channel, wherein the first and the second nonvolatile memory are identified by a first way and the third and the fourth nonvolatile memory are identified by a second way.

12. The semiconductor of claim 11, wherein the memory controller is configured to select one nonvolatile memory among the first to fourth nonvolatile memory, the selected one nonvolatile memory being not busy, based on the history information when the first and the second communication channels are busy.

13. The semiconductor of claim 12, wherein the history information of the previously executed commands comprises communication channel information of the previously executed commands and way information of the previously executed commands, wherein information of the first and the second communication channel are managed at the history information and way information of the selected one nonvolatile memory is not managed at the history information.

14. The semiconductor of claim 13, wherein the communication channel information and the way information are derived from Logical Block Address information.

15. The semiconductor of claim 13, wherein the memory controller is configured to remove one of the previously executed commands from the history information when all operations associated with the one of the previously executed commands have completed.

16. A method of operating a semiconductor device, comprising:

queuing commands transferred from a host and maintaining at least two commands; and then selecting one of the at least two commands to be executed in one nonvolatile memory among a plurality of nonvolatile memories connected to a plurality of channels respectively, based on history information of previously executed commands, wherein the selected one of the at least two commands has a shortest expected blocking time.

17. The method of claim 16, wherein the selected one of the at least two commands indicates channel which is not managed at the history information.

18. The method of claim 16, wherein the selected one of the at least two commands indicates channel and way which are not managed at the history information.

19. The method of claim 16, further comprising:

removing one of the previously executed commands from the history information when all operations associated with the one of the previously executed commands have completed.

* * * * *